(12) United States Patent
Yokoyama et al.

(10) Patent No.: US 8,980,468 B2
(45) Date of Patent: Mar. 17, 2015

(54) PRISMATIC SECONDARY BATTERY

(71) Applicants: SANYO Electric Co., Ltd., Moriguchi-shi, Osaka (JP); Toyota Jidosha Kabushiki Kaisha, Toyota-shi, Aichi (JP)

(72) Inventors: Yoshinori Yokoyama, Kasai (JP); Takayuki Hattori, Kasai (JP); Yasuhiro Yamauchi, Kasai (JP); Toshiyuki Nohma, Kobe (JP); Hironori Harada, Nukata-gun (JP); Toshihiro Takada, Nagoya (JP); Hiroshi Inukai, Toyota (JP)

(73) Assignees: SANYO Electric Co., Ltd., Daito-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 100 days.

(21) Appl. No.: 13/750,425

(22) Filed: Jan. 25, 2013

(65) Prior Publication Data
US 2013/0196186 A1 Aug. 1, 2013

(30) Foreign Application Priority Data
Jan. 27, 2012 (JP) .................. 2012-014818

(51) Int. Cl.
H01M 2/00 (2006.01)
H01M 2/02 (2006.01)
H01M 2/08 (2006.01)
(Continued)

(52) U.S. Cl.
CPC .............. *H01M 2/1229* (2013.01); *H01M 2/22* (2013.01); *H01M 2/263* (2013.01); *H01M 2/345* (2013.01); *H01M 2/0217* (2013.01); *H01M 2/06* (2013.01); *H01M 10/0431* (2013.01)

USPC ................. 429/181; 429/53; 429/56; 429/57; 429/185; 429/186

(58) Field of Classification Search
USPC ............ 429/53–56, 61–64, 96–100, 163–187
See application file for complete search history.

(56) References Cited

U.S. PATENT DOCUMENTS 5,705,290 A 1/1998 Azema
5,766,790 A 6/1998 Kameishi et al.
(Continued)

FOREIGN PATENT DOCUMENTS

JP 08-171898 A 7/1996
JP 08-293301 A 11/1996
(Continued)

*Primary Examiner* — Basia Ridley
*Assistant Examiner* — Caitlin Wilmot
(74) *Attorney, Agent, or Firm* — Westerman, Hattori, Daniels & Adrian, LLP

(57) ABSTRACT

A current interruption mechanism for prismatic secondary battery includes a tubular conductive member electrically connected to a positive electrode external terminal, an inversion plate, and a positive electrode collector connected to the inversion plate. The positive electrode collector has a first region that is parallel to a sealing body and a second region that is connected to a positive electrode plate. The boundaries between the first and second regions are disposed further outward than the inner surface of the tubular conductive member, and at least one of the edge portions, other than the boundaries between the first region and second region, is located further outward than the inner surface of the tubular portion of the conductive member. The current interruption mechanism is unlikely to be damaged even if the battery is subjected to shock due to vibration, falling, etc.

19 Claims, 9 Drawing Sheets

(51) Int. Cl.
   *H01M 2/12* (2006.01)
   *H01M 2/22* (2006.01)
   *H01M 2/26* (2006.01)
   *H01M 2/34* (2006.01)
   *H01M 2/06* (2006.01)
   *H01M 10/04* (2006.01)

(56) References Cited

U.S. PATENT DOCUMENTS

| | | |
|---|---|---|
| 5,985,478 A | 11/1999 | Kim |
| 6,228,523 B1 | 5/2001 | Azema |
| 6,248,470 B1 | 6/2001 | Azema et al. |
| 2008/0038627 A1 | 2/2008 | Yamauchi et al. |
| 2008/0038628 A1 | 2/2008 | Yamauchi et al. |
| 2010/0233529 A1 | 9/2010 | Nansaka et al. |

FOREIGN PATENT DOCUMENTS

| | | |
|---|---|---|
| JP | 09-055197 A | 2/1997 |
| JP | 11-120979 A | 4/1999 |
| JP | 11-154504 A | 6/1999 |
| JP | 11-307080 A | 11/1999 |
| JP | 11-329405 A | 11/1999 |
| JP | 2008-066254 A | 3/2008 |
| JP | 2008-066255 A | 3/2008 |
| JP | 2010-212034 A | 9/2010 |

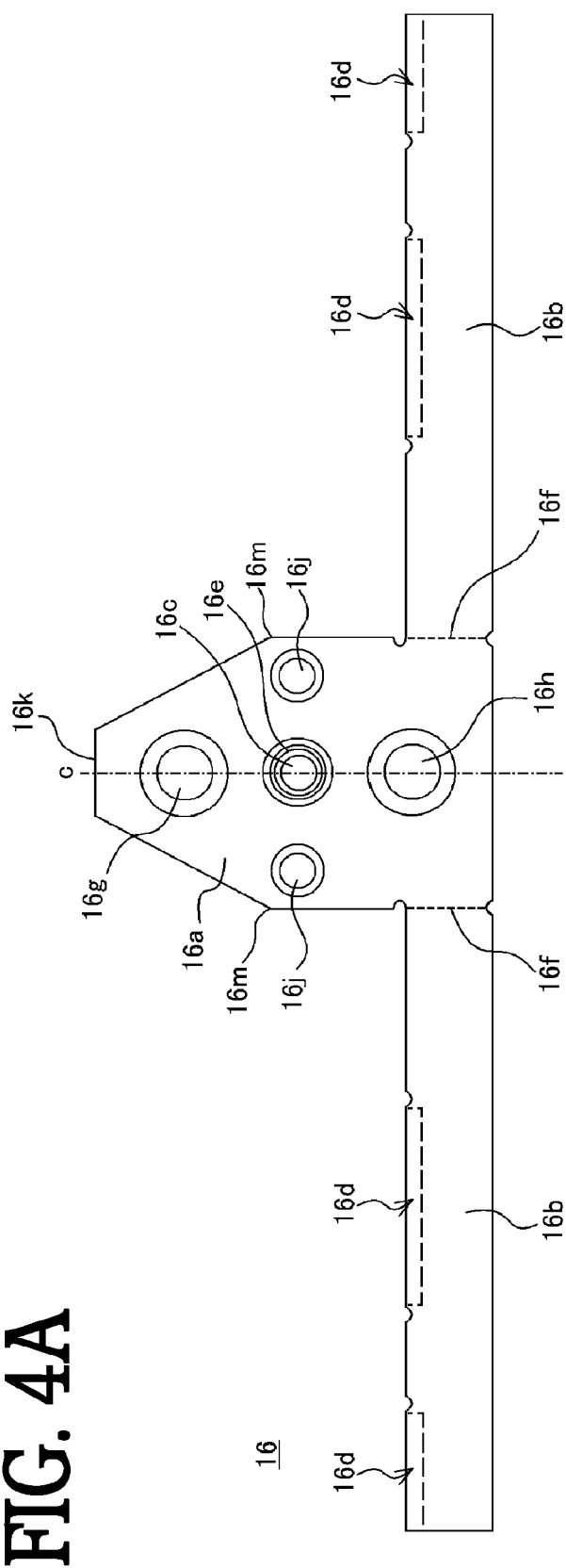
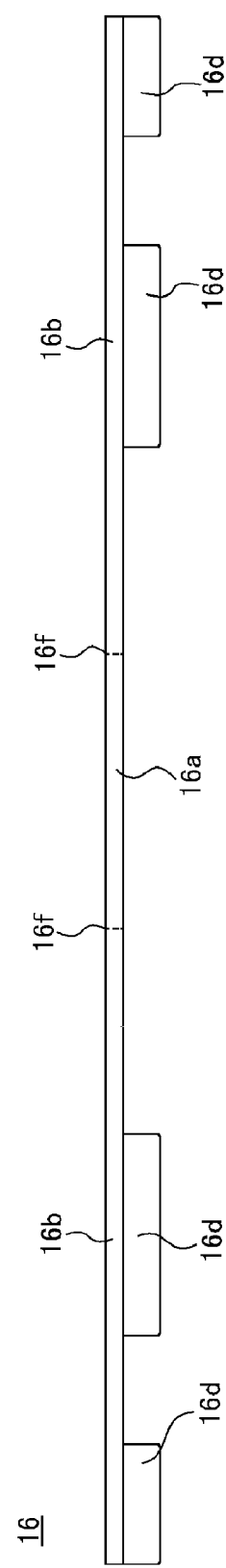
FIG. 4A
FIG. 4B

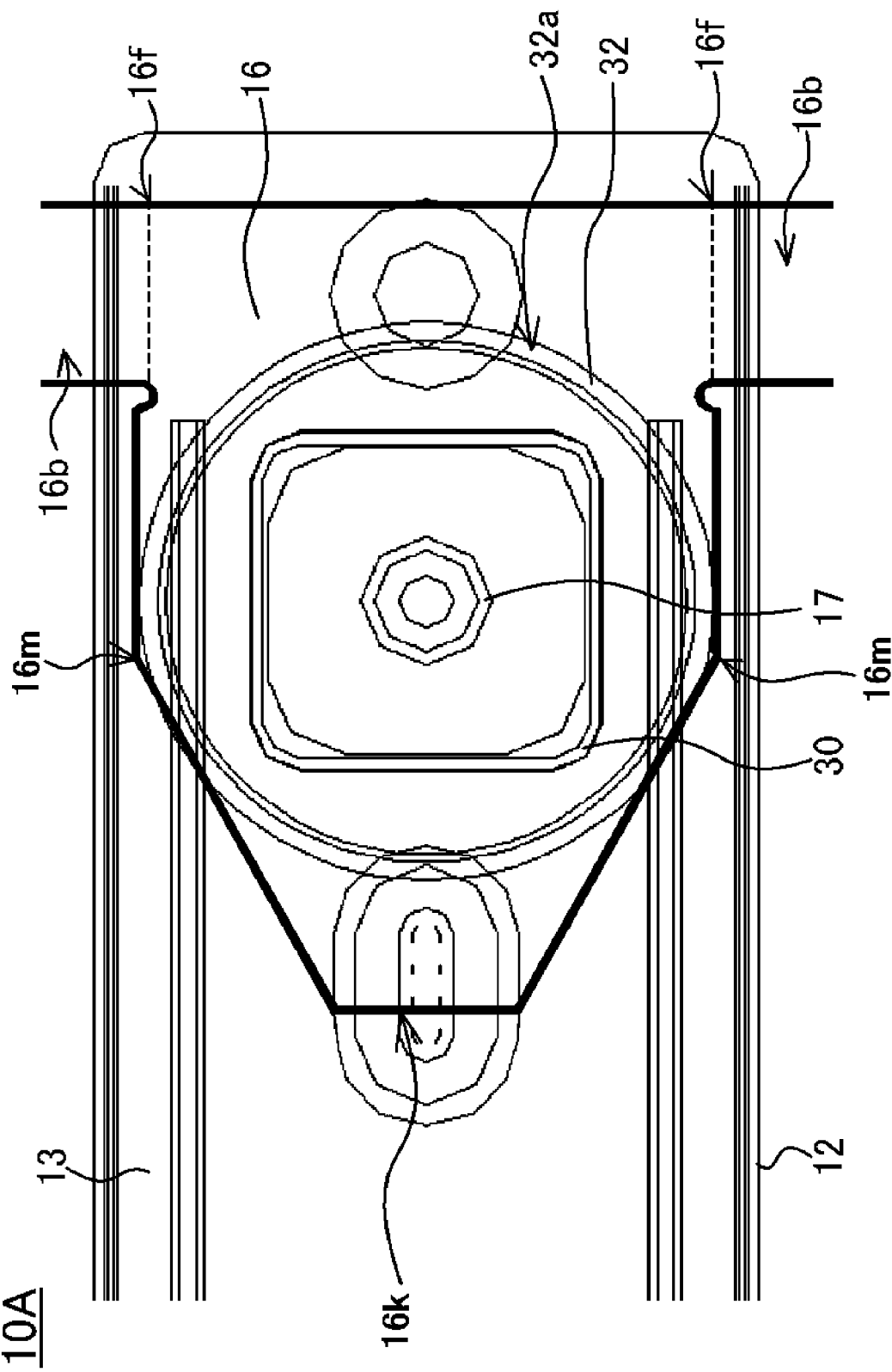

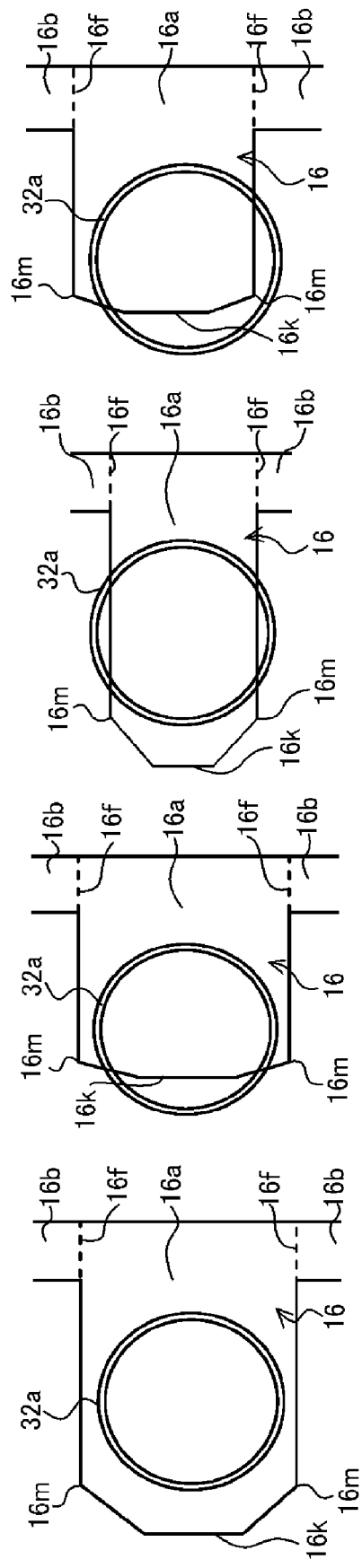

# PRISMATIC SECONDARY BATTERY

TECHNICAL FIELD

The present invention relates to a prismatic secondary battery, such as a nonaqueous electrolyte secondary battery or nickel-hydrogen secondary battery, that internally includes a current interruption mechanism.

BACKGROUND ART

As the drive power sources for portable electronic equipment such as mobile telephones (including smartphones), portable computers, PDAs, and portable music players, much use is made of alkaline secondary batteries and nonaqueous electrolyte secondary batteries, typified by nickel-hydrogen batteries and lithium ion batteries, respectively. Furthermore, alkaline secondary batteries and nonaqueous electrolyte secondary batteries are also much used as drive power sources for electric vehicles (EVs) and hybrid electric vehicles (HEVs, PHEVs), and in stationary storage battery systems in applications for curbing output variation of photovoltaic power generation and wind power generation, etc., in grid power peak load shifting applications for storing power at night and using it in the daytime, and in other applications. Particularly in EV, HEV and PHEV applications or stationary storage battery systems, high capacity and high output characteristics are required. Individual batteries accordingly get larger and are used connected in series or in parallel. Prismatic secondary batteries are widely used in such cases, because of their space efficiency.

Materials extremely rich in reactivity are used for the batteries in such applications, and particularly for nonaqueous electrolyte secondary batteries. Consequently, such batteries are required to have much higher safety than the secondary batteries used for small-sized portable equipment. Therefore, prismatic secondary batteries that are used for applications of the foregoing kinds are provided not only with a gas escape valve for releasing the battery outer casing internal pressure when it increases, but also with a current interruption mechanism for breaking the electrical connection between the external terminals and the electrode assembly inside the outer casing—as set forth, for example, in JP-A-2008-66254, JP-A-2008-66255 and JP-A-2010-212034.

For example, JP-A-2008-66254 discloses the invention of a prismatic secondary battery 50 that, as shown in FIG. 8A, includes an external terminal 53 having a through-hole 52 putting a current interruption mechanism 51 in communication with the space exterior to the prismatic secondary battery 50, and is so configured that the current interruption mechanism 51 is reliably actuated when the pressure inside the outer casing 54 increases. Furthermore, JP-A-2008-66255 discloses the invention of a prismatic secondary battery 60 that, as shown in FIG. 8B, includes an external terminal 63 having a through-hole 62 putting a current interruption mechanism 61 in communication with the space exterior to the prismatic secondary battery 60, and is so configured that the current interruption mechanism 61 is actuated when the pressure inside the outer casing 64 increases, and configured that the through-hole 62 is sealed by a membrane plug 65 of resin, in order to prevent moisture or oxygen from entering the current interruption mechanism 61 through the through-hole 62 and causing deterioration of the current interruption mechanism 61.

In the prismatic secondary batteries disclosed in JP-A-2008-66254 and JP-A-2008-66255, the through-hole is provided so that the battery exterior is in communication with the space in the current interruption mechanism that corresponds to the outside of the battery, and hence that the current interruption mechanism will be readily actuated when the pressure inside the outer casing increases. However, even if the pressure inside the outer casing increases due to some cause, the pressure of the gas that is produced in the battery interior will be extremely high during the abnormality, and there will be no simultaneous similar increase in the pressure inside the sealed space in the current interruption mechanism that corresponds to the outside of the battery. This means that there will be no substantial difference in the actuation of the current interruption mechanism, whether the space in the current interruption mechanism that corresponds to the outside of the battery is sealed or open.

JP-A-2010-212034 therefore discloses a prismatic secondary battery 70 that, as shown in FIG. 9, has a sealing body 71 that seals the mouth of the outer casing (omitted from the drawing), and a connection terminal 72 that is installed to the sealing body 71, with the object of rendering it difficult for electrolyte or cleaning fluid to enter the inside of the current interruption mechanism during manufacture. In this prismatic secondary battery 70, a current interruption mechanism 74 that interrupts the current in response to an increase in the pressure inside the outer casing is provided between the connection terminal 72 and a collector 73 that electrically connects the connection terminal 72 to the electrode assembly (omitted from the drawing); the connection terminal 72 has a through-hole 75 formed in its interior, the through-hole 75 which communicates with the space in the current interruption mechanism 74 that corresponds to the outside of the battery; and the through-hole 75 is sealed by a terminal plug 76 formed of an elastic member, so that a sealed space is formed between the through-hole 75 and the current interruption mechanism 74.

This current interruption mechanism 74 includes an inversion plate 77 that performs the function of a valve body, and the thin portion 73a of the collector 73. An annular groove 73b is formed in the thin portion 73a of the collector 73, and the inversion plate 77 is welded to the central part of the thin portion 73a. Moreover, the edge portion 77a around the periphery of the inversion plate 77 is welded to the inner circumferences of a flange portion 78a formed at the bottom end of the tubular portion of a tab member 78. The connection terminal 72 is electrically insulated from the sealing body 71 with an upper first insulating member 79 and a lower first insulating member 80 interposed therebetween, and is electrically connected to the top end of the tubular portion of the tab member 78. A second insulating member 81 of resin is disposed between the collector 73 and the inversion plate 77 at the periphery of the current interruption mechanism 74, and this second insulating member 81 is fixed to and integrated with the lower first insulating member 80 by latching-fixing portions 81a. As a result, when the pressure inside the outer casing increases, the inversion plate 77 is deformed toward the sealing body 71, and then the thin portion 73a of the collector 73 is cut through at the groove 73b. The electrical connection between the collector 73 and the inversion plate 77 is thus broken. This has the effect of stopping any further charging or discharging of the battery.

The prismatic secondary battery disclosed in JP-A-2010-212034 has high safety because it includes a current interruption mechanism. Moreover, during manufacture, the nonaqueous electrolyte or cleaning fluid, etc., will be unlikely to enter the current interruption mechanism. Thus, this invention offers the excellent advantages of a prismatic nonaqueous electrolyte secondary battery that includes high-reliability connection terminals.

However, in the event that the battery is subjected to shock due to vibration, falling, etc., the electrode assembly may shift toward the sealing body. In this case, the collector, which is connected to the electrode assembly, will also shift toward the sealing body. In the prismatic secondary battery 70 disclosed in JP-A-2010-212034, the shifting of the collector 73 toward the sealing body 71 will result in the collector 73 entering the interior of the tubular portion of the tab member 78, so that pressure will act on the welds between the tab member 78 and the inversion plate 77. This may cause fractures, cracks or the like in the welds between the edge portion 77a around the periphery of the inversion plate 77 and the inner circumference of the flange portion 78a formed at the bottom end of the tubular portion of the tab member 78. If fractures, cracks or the like are present in the welds between the inversion plate 77 and the flange portion 78a, the gas that is produced in the vicinity of the electrode assembly could enter the space inside the tubular portion of the tab member 78 through the fractures or cracks. The inversion plate 77 could fail to be deformed toward the sealing body 71 even if the pressure inside the outer casing increases, and the current interruption mechanism could cease to operate normally.

The present inventors arrived at the present invention upon discovering, as a result of many and various experiments to verify the causes of possible occurrence of fracturing in the welds of prismatic secondary batteries, that whether such fracturing takes place depends on the sizes of the inversion plate 77 and the collector 73 disposed opposing it, and on how they are disposed.

SUMMARY

An advantage of some aspects of the invention is to provide a prismatic secondary battery that is high-reliability, including a current interruption mechanism between a collector and an external terminal, the current interruption mechanism which is unlikely to be damaged even if the battery is subjected to shock due to vibration, falling, etc.

According to an aspect of the invention, a prismatic secondary battery includes:

a prismatic outer casing that has a mouth, an electrode assembly that is housed inside the prismatic outer casing and has a positive electrode plate and a negative electrode plate, a positive electrode collector that is electrically connected to the positive electrode plate, a negative electrode collector that is electrically connected to the negative electrode plate, a sealing body that seals the mouth of the outer casing, at least one external terminal that is inserted into a first through-hole provided in the sealing body while being electrically insulated from the sealing body with a first insulating member interposed therebetween, a conductive member that has a tubular portion, an inversion plate containing conductive material, the inversion plate being deformed when the battery interior pressure exceeds a particular value, and a second insulating member that is interposed between the inversion plate and at least one of the positive electrode collector and the negative electrode collector, and in which a second through-hole is formed.

In the prismatic secondary battery, at least one of the positive electrode collector and the negative electrode collector is electrically connected to the inversion plate through the second through-hole formed in the second insulating member.

One end of the tubular portion of the conductive member is electrically connected to the external terminal, and the other end is sealed by the inversion plate.

At least one of the positive electrode collector and the negative electrode collector has a first region that is parallel to the sealing body and a second region that extends from the first region in the direction of the electrode assembly and is connected to the positive electrode plate or negative electrode plate.

The boundary portion between the first and second regions is disposed further outward than the inner surface of the tubular portion of the conductive member, and at least one of the edge portions, other than the boundary portion, is located further outward than the inner surface of the tubular portion of the conductive member.

In the prismatic secondary battery of the invention, a pressure-sensitive current interruption mechanism is formed, as a safety means, with the conductive member that has a cylindrical portion, the inversion plate, the second insulating member, and at least one of the positive electrode collector and the negative electrode collector. Specifically, when the pressure inside the outer casing increases, the inversion plate is deformed, and then the connecting portion between the collector and the inversion plate, or the brittle portion of the thin portion, groove portion or similar provided in the collector, fractures. Consequently, the electrical connection between the collector and the inversion plate is interrupted and current ceases to flow between the prismatic secondary battery and the external circuits. Thus, a prismatic secondary battery with superior safety is obtained.

Moreover, in the prismatic secondary battery of the invention, the boundary between the first and second regions formed in at least one of the positive electrode collector and the negative electrode collector, and at least one edge of the first region, other than the boundary with the second region, are disposed so as to be located further outward than the inner surface of the tubular portion of the conductive member. Thanks to this, even if the electrode assembly shifts toward the sealing body because the prismatic secondary battery is subjected to shock due to vibration, falling, etc., the boundary between the first and second regions and the at least one edge of the first region, other than the boundary with the second region, will be unlikely to enter inside the tubular portion interior, due to contacting against the other end of the tubular portion of the conductive member. This curbs cracking, fracturing, etc., of the connecting portion between the inversion plate and at least one of the positive electrode collector and the negative electrode collector. Thus, a high-reliability prismatic secondary battery will be obtained in which the current interruption mechanism will be unlikely to suffer damage if the battery is subjected to shock due to vibration, falling, etc.

The prismatic secondary battery of the invention can be applied both to a nonaqueous electrolyte secondary battery and to a nickel-hydrogen or similar secondary battery. Furthermore, it can also be applied to an electrode assembly including positive electrode plate(s) and negative electrode plate(s) wound or stacked together, with separators interposed for mutual insulation, into a flattened shape. The particular advantages of this invention will be yielded whether it is applied to the positive electrode side or the negative electrode side, and applying it to both sides will also be possible.

In the prismatic secondary battery of the invention, it is preferable that the first region protrude further outward, in all directions, than the inner surface of the tubular portion of the conductive member.

With such a structure, the sectional area of the conductive pathway from the second region up to the connection portion with the inversion plate in at least one of the first region of the positive electrode collector and the negative electrode collector can be enlarged. In addition, the contacting area between at least one of the positive electrode collector and the negative electrode collector and the second insulating member also can be enlarged. Thus, a high-reliability prismatic secondary can be obtained, in which the internal resistance is small and the dispositions of at least one of the positive electrode collector and the negative electrode collector and of the second insulating member are stable.

In the prismatic secondary battery of the invention, it is preferable that two second regions be provided, in mutually opposite positions relative to the first region.

With such a structure, the first region of the collector can be connected to the positive electrode plate or negative electrode plate via two second regions, so that the sectional areas of these second regions can be equivalently enlarged. Thus, a high-reliability prismatic secondary can be obtained which has low internal resistance and is capable of high current output.

In the prismatic secondary battery of the invention, it is preferable that the first and second regions be formed by folding a piece of plate material.

With such a structure, the first and second regions of the collector can be easy to form. Moreover, the boundary between the first and second regions will be of high strength, so that a high-reliability prismatic secondary will be easily obtained.

In the prismatic secondary battery of the invention, it is preferable that the first and second regions be formed of a conductive material with rigidity.

The first and second regions of the collector are preferable to be formed of a conductive material with rigidity, since the electrode assembly will be curbed from shifting inside the outer casing in the event that the battery is subjected to shock due to vibration, falling, etc. The conductive material with rigidity will preferably be a metallic material of thickness not less than 0.3 mm, or more preferably not less than 0.5 mm.

In the prismatic secondary battery of the invention, it is preferable that a thin portion and/or a groove be formed at the periphery of the connecting portion between at least one of the positive electrode collector and the negative electrode collector and the inversion plate.

With a brittle portion, such as a thin portion and a groove, formed at the periphery of the connecting portion between at least one of the positive electrode collector and the negative electrode collector and the inversion plate, such a brittle portion will readily fracture when the inversion plate is deformed, and thus the safety will be enhanced. Determining the thickness and formation extent of such a brittle portion as appropriate enables setting the actuation pressure for the current interruption mechanism to a particular value, consequently enhancing the reliability. More preferably, the thin portion will be provided at the periphery of the connecting portion between at least one of the positive electrode collector and the negative electrode collector and the inversion plate, and an annular groove will be provided in the thin portion in such a manner as to encircle the connecting portion.

In the prismatic secondary battery of the invention, it is preferable that in the external terminal a through-hole be formed that puts the battery exterior in communication with the space on the inside of the tubular portion of the conductive member, and that the through-hole in the external terminal be sealed by a sealing member.

The through-hole is formed in the external terminal in order to implement leak inspection of the current interruption mechanism part-way through assembly. It sometimes happens that electrolyte or cleaning fluid enters the through-hole during the pouring-in of the electrolyte or during cleaning. If electrolyte or cleaning fluid enters the through-hole, the current interruption mechanism could be corroded and consequently cease to operate normally. With the prismatic secondary battery of the invention, the through-hole is sealed by a sealing member and moreover the space between the through-hole and the current interruption mechanism is a sealed space. Therefore, no electrolyte or cleaning fluid will enter the through-hole, and so the current interruption mechanism will not cease to operate normally. Thus, a high-reliability prismatic secondary battery will be obtained. Furthermore, a sealing plug including an elastic member can be used as the sealing member. Alternatively, a metallic member may be used as the sealing member, and the through-hole may be sealed by fitting the metallic member into the through-hole and welding the fit portion by irradiation with a laser or other high-energy beam. It will also be possible to use a sealing member of resin, or a sealing member composed of an elastic member and a metallic member.

In the prismatic secondary battery of the invention, the electrode assembly may be a flattened electrode assembly that has a plurality of stacked positive electrode exposed portions at one end and a plurality of stacked negative electrode exposed portions at the other end, with the positive electrode exposed portions being disposed so as to face to one sidewall of the prismatic outer casing and the negative electrode exposed portions being disposed so as to face to the other sidewall of the prismatic outer casing, and with the positive electrode collector being connected to the positive electrode exposed portions and the negative electrode collector being connected to the negative electrode exposed portions.

When the positive electrode exposed portions are disposed at one end of the prismatic outer casing and the negative electrode exposed portions at the other end, the distance between the positive electrode collector and the negative electrode collector can be enlarged, and so the prismatic secondary battery can be rendered high-capacity and assembly of the prismatic secondary battery will be facilitated. In addition, with such prismatic secondary battery of the invention, the collector will be connected to the exposed portions of the stacked substrates, and so a battery with superior output characteristics will be obtained.

BRIEF DESCRIPTION OF THE DRAWINGS

The invention will be described with reference to the accompanying drawings, wherein like numbers reference like elements.

FIG. 4A is an opened-out front view of the positive electrode collector of the prismatic nonaqueous electrolyte secondary battery in FIGS. 1A to 1C, and FIG. 4B is an opened-out side view of the same.

FIG. 5 is a schematic top view of the portion corresponding to FIG. 3, illustrating a dispositional relationship between a first region of the positive electrode collector and the tubular portion of a conductive member.

FIGS. 6A to 6D are schematics each illustrating a dispositional relationship between the first region of the collector and the tubular portion of the conductive member according to the invention, viewed from the top of the sealing body.

DESCRIPTION OF EXEMPLARY EMBODIMENT

Figure 1A:
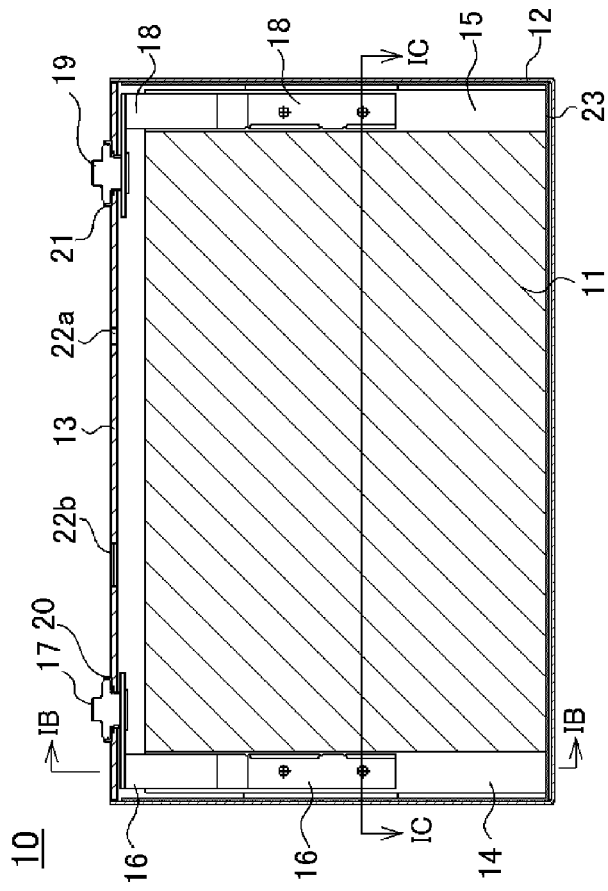
FIG. 1A is a sectional view of a prismatic nonaqueous electrolyte secondary battery of an embodiment.

An embodiment for carrying out the invention will now be described in detail with reference to the accompanying drawings. It is to be understood, however, that the following embodiment is intended as an illustrative example of a prismatic nonaqueous electrolyte secondary battery for the purpose of comprehending the technical concepts of the invention, and is not intended to limit the invention to this particular prismatic secondary battery; the invention can equally well be applied to yield many other variants without departing from the scope and spirit of the technical concepts set forth in the claims. Note that although the invention can be applied to prismatic secondary batteries that have an electrode assembly with a flattened shape produced by stacking or by winding positive electrode plate(s) and negative electrode plate(s) together with separators interposed, the description below is of a battery with a flattened wound electrode assembly, as a representative example.

Embodiment

First, the prismatic nonaqueous electrolyte secondary battery of the embodiment will be described using FIGS. 1 to 5.

The prismatic nonaqueous electrolyte secondary battery 10 of the embodiment has a flattened wound electrode assembly 11 in which a positive electrode plate and a negative electrode plate are wound together with separators (all omitted from the drawings) interposed. To fabricate the positive electrode plate, a positive electrode active material mixture is spread over both sides of a positive electrode substrate of aluminum foil, and the resulting object is dried and rolled, then is slit at one end so that the aluminum foil is exposed in strips aligned in the lengthwise direction. To fabricate the negative electrode plate, a negative electrode active material mixture is spread over both sides of a negative electrode substrate of copper foil, and the resulting object is dried and rolled, then is slit at one end so that the copper foil is exposed in strips aligned in the lengthwise direction.

The positive electrode plate and the negative electrode plate obtained in the foregoing manner are then wound together with polyethylene microporous separators interposed therebetween in a state in which neither the aluminum foil exposed portions of the positive electrode plate nor the copper foil exposed portions of the negative electrode plate overlap with the active material layer of their opposing electrode, thereby fabricating a flattened wound electrode assembly 11 that includes, at one end of the winding axis, a plurality of positive electrode substrate exposed portions 14 that are stacked, and at the other end, a plurality of negative electrode substrate exposed portions 15 that are stacked.

The positive electrode substrate exposed portions 14 are stacked together and electrically connected to a positive electrode external terminal 17 with a positive electrode collector 16 interposed therebetween. Likewise, the negative electrode substrate exposed portions 15 are stacked together and electrically connected to a negative electrode external terminal 19 with a negative electrode collector 18 interposed therebetween. The positive electrode external terminal 17 and the negative electrode external terminal 19 are fixed to a sealing body 13, with insulating members 20 and 21, respectively, interposed therebetween. In the prismatic nonaqueous electrolyte secondary battery 10 of the embodiment, a pressure-sensitive current interruption mechanism is located between the positive electrode collector 16 and the positive electrode external terminal 17 or between the negative electrode collector 18 and the negative electrode external terminal 19. The specific structure of this current interruption mechanism will be described later.

To fabricate the prismatic nonaqueous electrolyte secondary battery 10 of the embodiment, the flattened wound electrode assembly 11 fabricated in the foregoing manner is inserted into a prismatic outer casing 12, with a resin sheet 23 interposed around the periphery except at the sealing body 13. Subsequently, the sealing body 13 is laser-welded to the mouth portion of the outer casing 12, after which nonaqueous electrolyte is poured in through an electrolyte pour hole 22a and the electrolyte pour hole 22a is sealed. The sealing body 13 has a gas escape valve 22b that opens when gas pressure is exerted that exceeds the actuation pressure for the current interruption mechanism.

Furthermore, in the flattened wound electrode assembly 11 of the prismatic nonaqueous electrolyte secondary battery 10 of the embodiment, the stacked positive electrode substrate exposed portions 14 of the positive electrode plate are split into two groups, between which two intermediate conductive members 24 for the positive electrode are held. Likewise, the stacked negative electrode substrate exposed portions 15 of the negative electrode plate are split into two groups, between which two intermediate conductive members 25 for the negative electrode are held. The two positive electrode intermediate conductive members 24 and the two negative electrode intermediate conductive members 25 are held by insulative intermediate members 24p and 25p, respectively, that contains resin material.

On the outermost surface of each of the two positive electrode substrate exposed portion 14 groups, which are located at the two positive electrode intermediate conductive members 24, a positive electrode collector 16 is disposed. likewise on the outermost surface of each of the two negative electrode substrate exposed portion 15 groups, which are located at the two negative electrode intermediate conductive members 25, a negative electrode collector 18 is disposed. The positive electrode intermediate conductive members 24 contain aluminum, the same material as the positive electrode substrate. The negative electrode intermediate conductive members 25 contain copper, the same material as the negative electrode substrate. The positive electrode intermediate conductive members 24 can have a shape substantially identical to that of the negative electrode intermediate conductive members 25. The positive electrode substrate exposed portions 14 are resistance-welded both to the positive electrode collector 16 and to the positive electrode intermediate conductive members 24. Likewise, the negative electrode substrate exposed portions 15 are joined both to the negative electrode collector 18 and to the negative electrode intermediate conductive members 25 by resistance welding.

The prismatic nonaqueous electrolyte secondary battery 10 of the embodiment illustrates an example of using two positive electrode intermediate conductive members 24 and two negative electrode intermediate conductive members 25. However, it will alternatively be possible, depending on the required output of the battery, to use one each, or three or more. With a structure that uses two or more, the positive electrode intermediate conductive members 24 and the negative electrode intermediate conductive members 25 will be held by one insulative intermediate member of resin material, and so can be positioned and disposed in a stable state between the two split-up groups of substrate exposed portions.

Next will be described the methods for resistance-welding the positive electrode collector 16 and the positive electrode intermediate conductive members 24 to the positive electrode substrate exposed portions 14 of the flattened wound electrode assembly 11, and the methods for resistance-welding the negative electrode collector 18 and the negative electrode intermediate conductive members 25 to the negative electrode substrate exposed portions 15. However, in the prismatic nonaqueous electrolyte secondary battery 10 of the embodiment, the shapes of the positive electrode intermediate conductive members 24 and of the negative electrode intermediate conductive members 25 are substantially identical, and moreover the resistance-welding methods for both are substantially similar. Therefore, the description below deals with the methods on the positive electrode plate side only, as being representative.

First, the positive electrode substrate exposed portions 14 of aluminum foil, of the flattened wound electrode assembly 11, are stacked. The stacked positive electrode substrate exposed portions 14 are split into two groups from the winding center portion outward to the two sides, and each group is bunched around a center that is the line along ¼ of the thickness of the wound electrode assembly 11. Subsequently, the positive electrode collector 16 is disposed on the outermost peripheries, and the positive electrode intermediate conductive members 24 are disposed on the inner peripheries, of the two bunches of positive electrode substrate exposed portions 14, in such a manner that the truncated cone-shaped protrusions of both of the positive electrode intermediate conductive members 24 contact against the positive electrode substrate exposed portions 14. Each bunch of aluminum foil has thickness of about 660 μm and 44 stacked substrates (for a total of 88). The items used for the positive electrode collector 16 are fabricated by punching and bend-processing, etc., a 0.8 mm-thick aluminum sheet.

Next, the flattened wound electrode assembly 11, in which the positive electrode collector 16 and the positive electrode intermediate conductive members 24 are disposed, is disposed between a pair of resistance welding electrodes, omitted from the drawings, that are disposed one above the other. Subsequently, the pair of resistance welding electrodes are brought into contact with the positive electrode collector 16, each of which is disposed on the outermost periphery of one of the two bunches of positive electrode substrate exposed portions 14. A suitable degree of pushing pressure is then applied between the pair of resistance welding electrodes, and resistance welding is performed under certain predetermined conditions. Since the protrusions of the positive electrode intermediate conductive members 24 thereby act as projections, the positive electrode collector 16 and two bunches of positive electrode substrate exposed portions 14, which have been disposed between the pair of resistance welding electrodes, heat up well and so large nuggets are formed. Consequently, the welds are of extremely high strength between the positive electrode collector 16 and the two bunches of positive electrode substrate exposed portions 14, the welds among the positive electrode substrate exposed portions 14, and the welds between the two bunches of positive electrode substrate exposed portions 14 and the positive electrode intermediate conductive members 24.

Moreover, during such resistance welding, the positive electrode intermediate conductive members 24 are disposed in a stably positioned state between the two bunches of positive electrode substrate exposed portions 14. This leads to the resistance welding in an accurate and stable state, the curbing of variation in the weld strength, and the realizing of low resistance of the welds. A prismatic secondary battery that is capable of high current cycling thus can be manufactured. By repeating such resistance welding as many times as the number of positive electrode intermediate conductive members 24 used, all of the resistance welding is executed—between the positive electrode collector 16 and the two bunches of positive electrode substrate exposed portions 14, among the positive electrode substrate exposed portions 14, and between the two bunches of positive electrode substrate exposed portions 14 and the positive electrode intermediate conductive members 24. This resistance welding is carried out in the same manner for the negative electrodes.

Now will be described the pressure-sensitive current interruption mechanism that is interposed between the positive electrode collector 16 and the positive electrode external terminal 17 or between the negative electrode collector 18 and the negative electrode external terminal 19. This current interruption mechanism can be provided on the positive electrode side only, on the negative electrode side only, or on both the positive electrode and negative electrode sides. Below, the case where the mechanism is provided on the positive electrode side only is described, with reference to FIGS. 2 to 5.

Figure 1B:
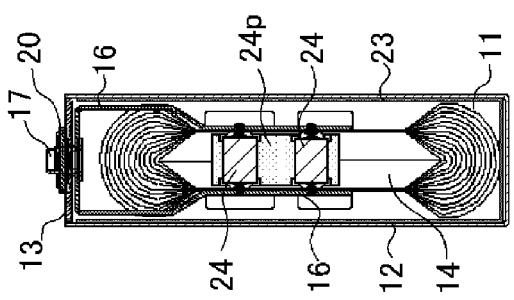
FIG. 1B is a sectional view along line IB-IB in FIG. 1A.
Figure 1C:
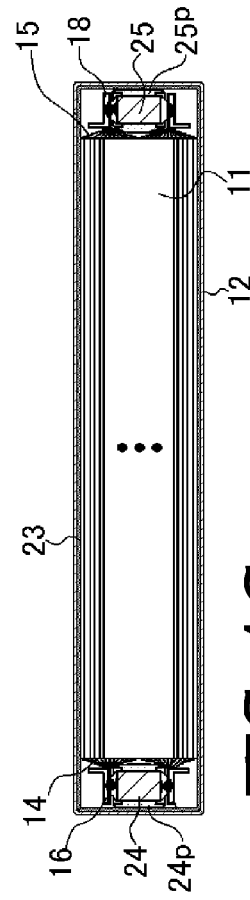
FIG. 1C is a sectional view along line IC-IC in FIG. 1A.
Figure 2:
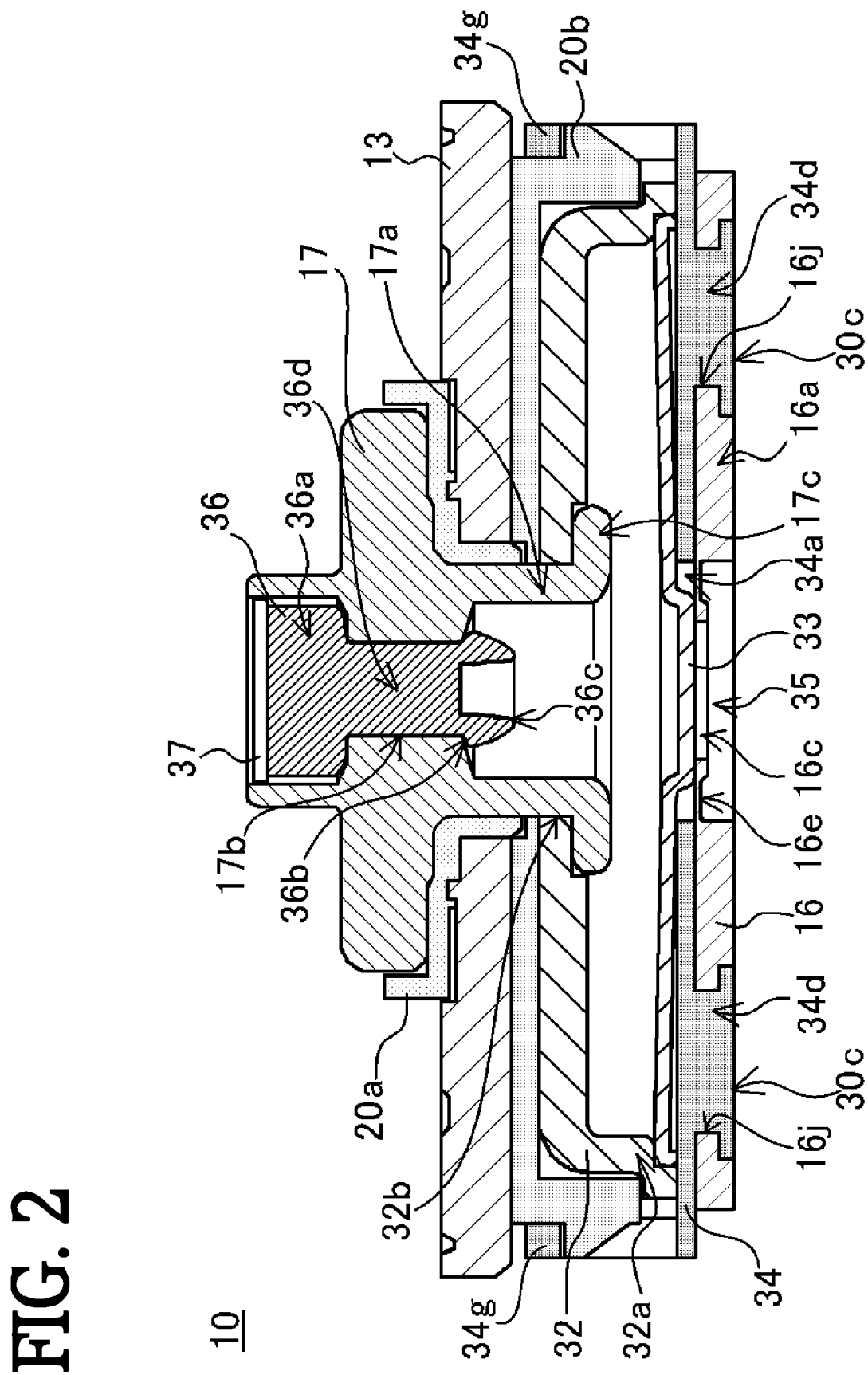
FIG. 2 is a sectional view, in the direction of the short sides of the outer casing, of a current interruption mechanism provided on the positive electrode side of the prismatic nonaqueous electrolyte secondary battery in FIGS. 1A to 1C.
Figure 3:
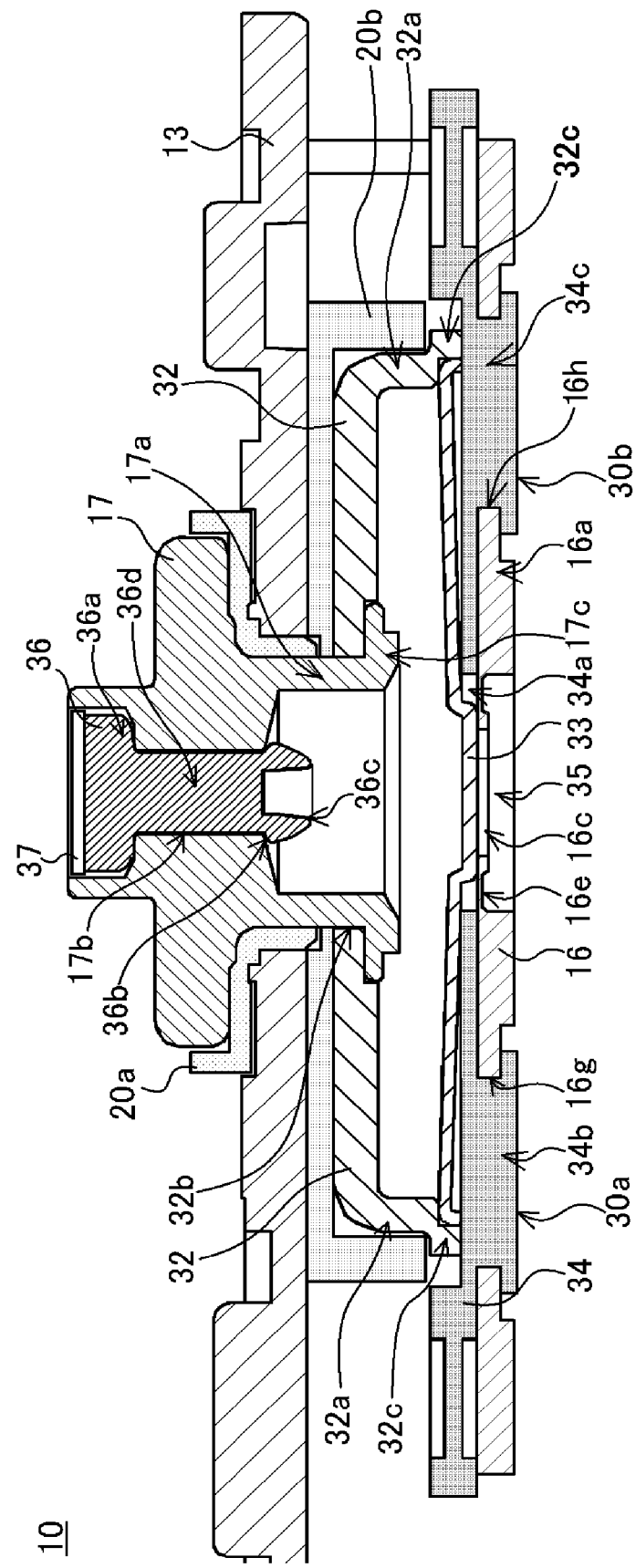
FIG. 3 is a sectional view, in the direction of the long sides of the outer casing, of the current interruption mechanism provided on the positive electrode side of the prismatic nonaqueous electrolyte secondary battery in FIGS. 1A to 1C.

As FIGS. 1A to 1C show, the positive electrode collector 16 is connected to the positive electrode substrate exposed portions 14 disposed at one end of the wound electrode assembly 11. The positive electrode collector 16 is electrically connected to the positive electrode external terminal 17. As shown in FIGS. 4A and 4B, which are an opened-out front view and side view, respectively, positive electrode collector 16 has a first region 16a that is disposed parallel to the sealing body 13, and a pair of second regions 16b that extend outward from the first region 16a in mutually opposite directions, are folded at the dashed lines (boundaries 16f), and are connected to the positive electrode substrate exposed portions 14. The positive electrode collector 16 is fabricated by punching from aluminum sheet of thickness 0.8 mm, therefore are rigid, and cannot be folded with a small force. In FIG. 4A, notched portions are formed in both of the boundaries 16f in order to facilitate folding of the positive electrode collector 16 along the boundaries 16f.

In the central portion of the first region 16a of the positive electrode collector 16, there is formed a connection forming hole 16c. On the centerline c that passes through the center of the connection forming hole 16c in the direction of the long sides of the sealing body 13, there are formed a first opening 16g and a second opening 16h, one on each side of the connection forming hole 16c. In the direction perpendicular to the centerline c, there are formed two third openings 16j, one on each side. The diameters of the first opening 16g and second opening 16h are identical. The diameters of both two third openings 16j are identical and are determined so as to be smaller than the diameters of the first opening 16g and second opening 16h. In the second regions 16b of the positive electrode collector 16, there are formed ribs 16d on the side facing the positive electrode substrate exposed portions 14. These ribs 16d perform the roles of positioning the positive electrode collector 16 relative to the positive electrode substrate exposed portions 14, positioning the wound electrode assembly 11 relative to the battery outer casing 12, preventing the spatter that occurs during resistance welding of the positive electrode collector 16 to the positive electrode substrate exposed portions 14 from entering the wound electrode assembly 11, and so forth. The portion around the circumference of the connection forming hole 16c in the first region 16a is an annular thin region 16e whose thickness is smaller than those of the other portions.

The positive electrode external terminal 17 has tubular portion 17a, and a through-hole 17b formed in its interior. The tubular portion 17a of the positive electrode external terminal 17 is inserted into holes formed in an upper first insulating member 20a such as a gasket, in the sealing body 13, in a lower first insulating member 20b and in conductive member 32 having a tubular portion 32a, and the tip portions 17c are swaged and fixed so as to be mutually integrated. The conductive member 32 has a tubular portion 32a formed at its battery interior end, while at its battery exterior end—that is, sealing body 13 end, where the diameter narrows—there is formed opening 32b into which the tubular portion 17a of the positive electrode external terminal 17 is inserted. The tip portion 17c of the tubular portion 17a of the positive electrode external terminal 17 is swaged near the opening 32b in the conductive member 32, and is laser-welded to the connection portion of the conductive member 32. Thereby, the positive electrode external terminal 17 is electrically connected to the conductive member 32 in such a state as to be electrically insulated from the sealing body 13 by the upper first insulating member 20a and the lower first insulating member 20b. Both the upper first insulating member 20a and the lower first insulating member 20b correspond to the first insulating member of the invention.

The periphery of an inversion plate 33 is hermetically welded to the battery interior-end tip of the tubular portion 32a of the conductive member 32. The inversion plate 33 is shaped so as to protrude slightly, from the periphery towards the center, in the direction of the battery interior—that is, shaped so as to be in a slanted positional relationship with the sealing body 13. The inversion plate 33 contains a conductive material and has the function of a valve that is deformed toward the exterior of the battery when the pressure inside the outer casing 12 increases. The first region 16a of the positive electrode collector 16 contacts against the center portion of the inversion plate 33. The inner wall portion of the connection forming hole 16c in the thin region 16e formed in the first region 16a is laser-welded at a plurality of locations to the surface of the inversion plate 33. Although omitted from the drawings, these locations where the inner wall portion of the connection forming hole 16c in the thin region 16e is laser-welded to the surface of the inversion plate 33 correspond to the connections of the invention.

Furthermore, between the first region 16a of positive electrode collector 16 and the inversion plate 33, there is formed a second insulating member 34 that contains resin material and has a through-hole 34a. The first region 16a of positive electrode collector 16 is electrically connected to the inversion plate 33 through the through-hole 34a. Around this through-hole 34a in the second insulating member 34, there are formed a first projection 34b in the position corresponding to the first opening 16g in the first region 16a of the positive electrode collector 16, a second projection 34c in the position corresponding to the second opening 16h, and a third projection 34d in the position corresponding to the third openings 16j.

The first to third projections 34b to 34d of the second insulating member 34 are inserted into the first to third openings 16g to 16j, respectively, formed in the first region 16a of positive electrode collector 16, and by heating the tips of the first to third projections 34b to 34d to widen their diameters, the second insulating member 34 and the first region 16a of positive electrode collector 16 are fixed to each other. As a result, the first to third projections 34b to 34d of the second insulating member 34 are, thanks to the widened-diameter portions formed in each of them, prevented from falling out from the first to third openings 16g to 16j formed in the first region 16a of positive electrode collector 16, and the second insulating member 34 are robustly joined to the first region 16a of positive electrode collector 16. The first to third fixing portions 30a to 30c are formed from these first to third openings 16g to 16j formed in the first region 16a of positive electrode collector 16 and from the first to third projections 34b to 34d of the second insulating member 34. The second insulating member 34 and the lower first insulating member 20b, which constitute the first insulating member, will preferably be fixed together by engaging to each other. There is no particular restriction on such fixing method, but in this embodiment, the second insulating member 34 and the lower first insulating member 20b constituting the first insulating member are fixed together by means of latch portions 34g.

Thus, the positive electrode substrate exposed portions 14 are electrically connected to the positive electrode external terminal 17 via the first and second regions 16a and 16b and thin region 16e of positive electrode collector 16, and via the inversion plate 33 and the conductive member 32. The current interruption mechanism of this embodiment is formed with the tubular portion 32a of the conductive member 32, the inversion plate 33, the second insulative member 34, and the thin region 16e that is formed in the first region 16a of positive electrode collector 16.

Specifically, the inversion plate 33 is so configured so as to swell toward the through-hole 17b in the positive electrode external terminal 17 when the pressure inside the battery outer casing 12 increases. Since the thin region 16e in the first region 16a of positive electrode collector 16 is welded to the central portion of the inversion plate 33, the first region 16a of positive electrode collector 16 fractures at the thin region 16e portion when the pressure inside the outer casing 12 exceeds a particular level. Consequently, the electrical connection between the inversion plate 33 and the first region 16a of positive electrode collector 16 is interrupted.

Thus, with the thin region 16e, first region 16a will be prone to fracture at the thin region 16e portion when the inversion plate 33 is deformed, and will reliably fracture at the thin region 16e portion when the pressure inside the battery increases. This enhances the safety of the prismatic electrolyte nonaqueous secondary battery 10. It is also possible, by determining the thickness and formation extent of the thin region 16e portion as appropriate, to set the pressure at which the thin region 16e portion fractures as the particular pressure level. This too will enhance the reliability.

An example has been described here in which the thin region 16e, which has a thickness smaller than the other portions, is formed ring-like in the portion around the periphery of the connection forming hole 16c in the first region 16a. However, it will be more preferable that, in the thin region 16e, a ring-like groove be provided so as to encircle the connection forming hole 16c. This groove may also be formed in an intermittent annular form. It is alternatively possible to form the thin region 16e by leaving the periphery portion around the connection forming hole 16c in the first region 16a with the same thickness as the other portions and forming in such periphery portion an annular or intermittent annular groove. The thin region 16e and groove are not essential structural elements. It will alternatively be possible, without providing the thin region 16e or groove, to adjust the strength of the connections between the inversion plate 33 and positive electrode collector 16 so that such connections will be broken if the inversion plate 33 is deformed.

Furthermore, as FIG. 5 shows, in the prismatic nonaqueous electrolyte secondary battery 10 of the embodiment, the boundaries 16f between the first region 16a and the second regions 16b of positive electrode collector 16 are disposed so as to be located further outward than the inner surface of the tubular portion 32a of the conductive member 32. Moreover, one or more edges of the first region 16a, other than the boundaries with the second regions 16b—in this embodiment, all such edges of the first region 16a (protruding edge 16k, side edges 16m and so forth)—are likewise located further outward than the inner surface of the tubular portion 32a of the conductive member 32, so that the first region 16a is so disposed as to be located further outward than the inner surface of the tubular portion 32a of the conductive member 32 in all directions.

With such dispositions, even if the prismatic nonaqueous electrolyte secondary battery 10 is subjected to shock due to vibration, falling, etc., and the wound electrode assembly 11 shifts toward the sealing body 13, the fact that the boundaries 16f between the first region 16a and the second regions 16b of positive electrode collector 16, and the protruding edge 16k of the first region 16a, are disposed so as to be located further outward than the inner surface of the tubular portion 32a of the conductive member 32 means that the first region 16a of positive electrode collector 16, due to contacting against the other edge of the tubular portion 32b of the conductive member 32, will not be able to move any further toward the sealing body 13.

Moreover, the positive electrode collector 16 includes items that have rigidity and cannot be folded by a small force. Thus, when the wound electrode assembly 11 shifts toward the sealing body 13 due to vibration, falling, etc., the force that acts on the first region 16a of positive electrode collector 16 will be absorbed by the second region 16b portions and thus be rendered small. Hence, in the event that the wound electrode assembly 11 shifts toward the sealing body 13 due to vibration, falling, etc., the force exerted will be small, the possibility of the thin region 16e fracturing will thus be suppressed, and the influence upon the actuation of the pressure-sensitive current interruption mechanism 35 will be small. In this way, a prismatic nonaqueous electrolyte secondary battery 10 with superior safety and reliability will be obtained.

The through-hole 17b in the top part of the positive electrode external terminal 17 is used for testing whether the periphery of the inversion plate 33, which is a component of the current interruption mechanism 35, has been welded hermetically, and may be used in an unchanged state. However, if corrosive gas or liquid enters the through-hole 17b and the inversion plate 33 becomes corroded, a risk will arise that the current interruption mechanism 35 may not operate normally. Thus, it will be preferable to seal up the through-hole 17b of the positive electrode external terminal 17. In the prismatic nonaqueous electrolyte secondary battery 10 of the embodiment, the through-hole 17b formed in the positive electrode external terminal 17 has a large-diameter portion formed toward the exterior of the outer casing 12 and a small-diameter portion formed toward the interior of the outer casing 12. Taking advantage of this configuration, the through-hole 17b of the positive electrode external terminal 17 is robustly sealed by a rubber terminal plug 36 in its interior. This terminal plug 36 has: at the upper end, a head portion 36a whose diameter is larger than the small-diameter portion of the through-hole 17b of the positive electrode external terminal 17 and smaller than the large-diameter portion of the through-hole 17b of the positive electrode external terminal 17; at the lower end, a projecting portion 36b whose diameter is smaller than the head portion 36a and larger than the small-diameter portion of the through-hole 17b; latching portions 36c formed in a shape that tapers off from the projecting portion 36b; and in an intermediate position, a connecting portion 36d that has a diameter roughly the same as the small-diameter portion of the through-hole 17b of the positive electrode external terminal 17 and a length substantially the same as such small-diameter portion.

The terminal plug 36 is installed into the through-hole 17b of the positive electrode external terminal 17 in such a manner that the head portion 36a is located at the large-diameter portion of the through-hole 17b, and the latching portions 36c protrude beyond the end of the small-diameter portion of the through-hole 17b. Furthermore, on the surface of the head portion 36a of the terminal plug 36, there is provided a metallic plate 37 of aluminum or other materials, to give the head portion 36a high strength even though its thickness is small. This metallic plate 37 can be weld-fixed to the positive electrode external terminal 17 by laser welding or other methods. The metallic plate 37 could potentially fall out due to vibration, etc., since it is formed of an elastic member. However, weld-fixing the metallic plate 37 to the positive electrode external terminal 17 will render the through-hole 17b more robustly sealed by the terminal plug 36.

Furthermore, in the prismatic secondary battery 10 of the embodiment, the space in the current interruption mechanism 35 that corresponds to the exterior is completely sealed. But even if the pressure inside the outer casing 12 increases due to some cause, the pressure of the gases produced inside the battery will become extremely high during abnormality, and there will be no simultaneous similar increase in the pressure inside the sealed space in the current interruption mechanism 35 adjacent to the exterior of the battery. Thus, the space adjacent to the battery exterior being sealed will pose no problem for actuation of the current interruption mechanism 35.

The foregoing description of the prismatic nonaqueous electrolyte secondary battery 10 of the embodiment sets forth an example where the boundaries 16f between the first region 16a and second regions 16b of positive electrode collector 16, and the protruding edge 16k of the first region 16a, are disposed so as to be located further outward than the inner surface of the tubular portion 32a of the conductive member 32. However, the same effects and advantages will be obtained in the invention if the boundaries 16f between the first region 16a and second regions 16b of positive electrode collector 16 are disposed so as to be located further outward than the inner surface of the tubular portion 32a of the conductive member 32, and at least one edge of the first region 16a (the center edge lying in the direction of the long sides of the sealing body 13, the edges lying in the direction of the short sides of the sealing body 13, and so forth), other than the boundaries with the second regions 16b, is likewise located further outward than the inner surfaces of the tubular portion 32a of the conductive member 32.

Figure 7B:
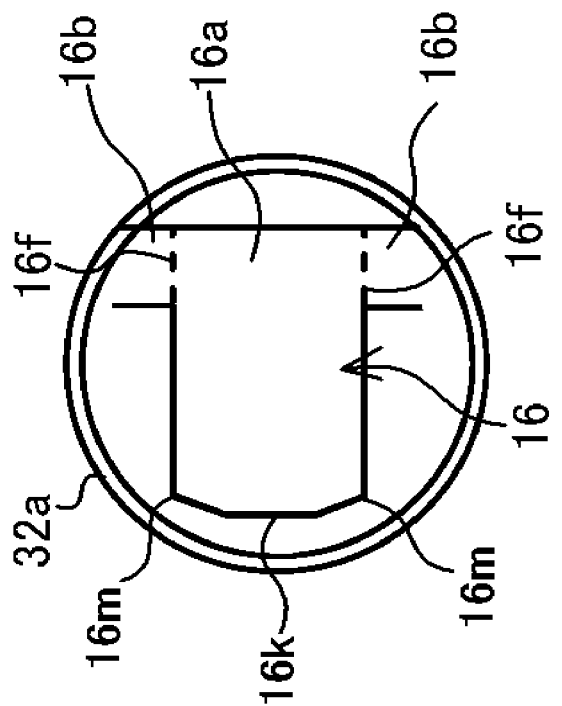
FIGS. 7A and 7B are schematics each illustrating a dispositional relationship between the first region of a collector and the tubular portion of a conductive member not according to the invention, viewed from the top of a sealing body.
Figure 7A:
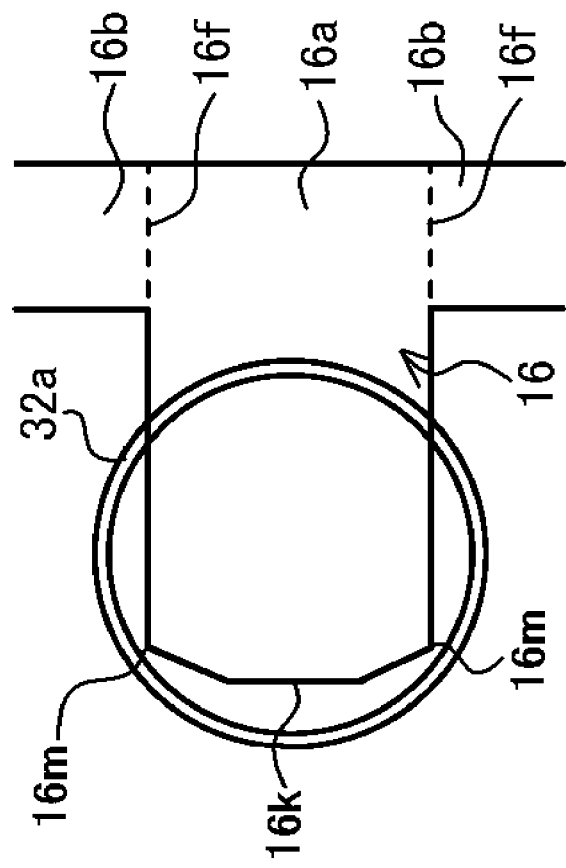
Figure 8B:
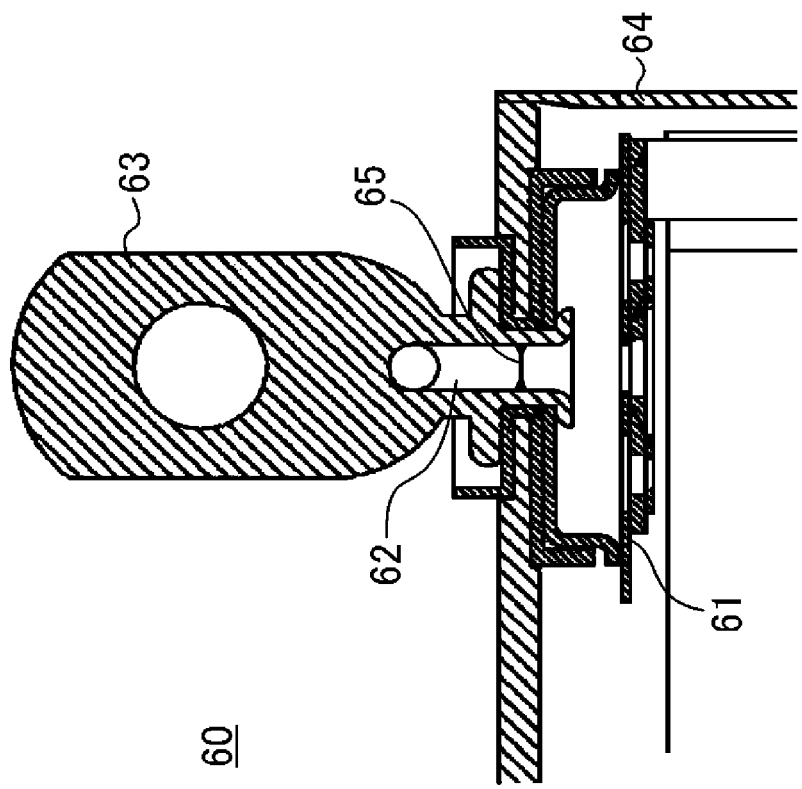
FIG. 8B is a sectional view of the current interruption mechanism in another prismatic secondary battery of the related art.
Figure 8A:
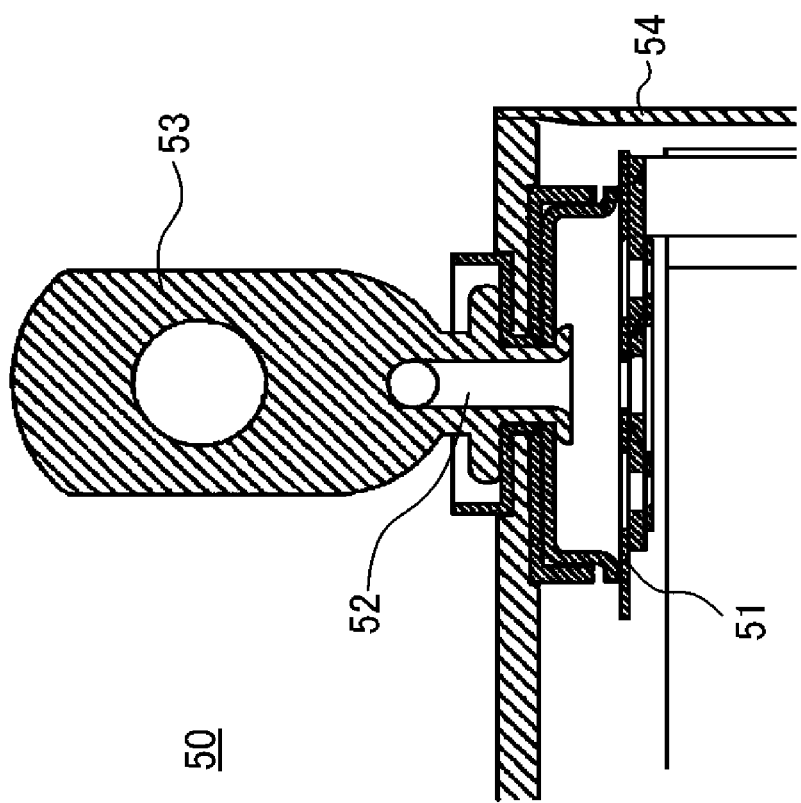
FIG. 8A is a sectional view of the current interruption mechanism in a prismatic secondary battery of the related art.
Figure 9:
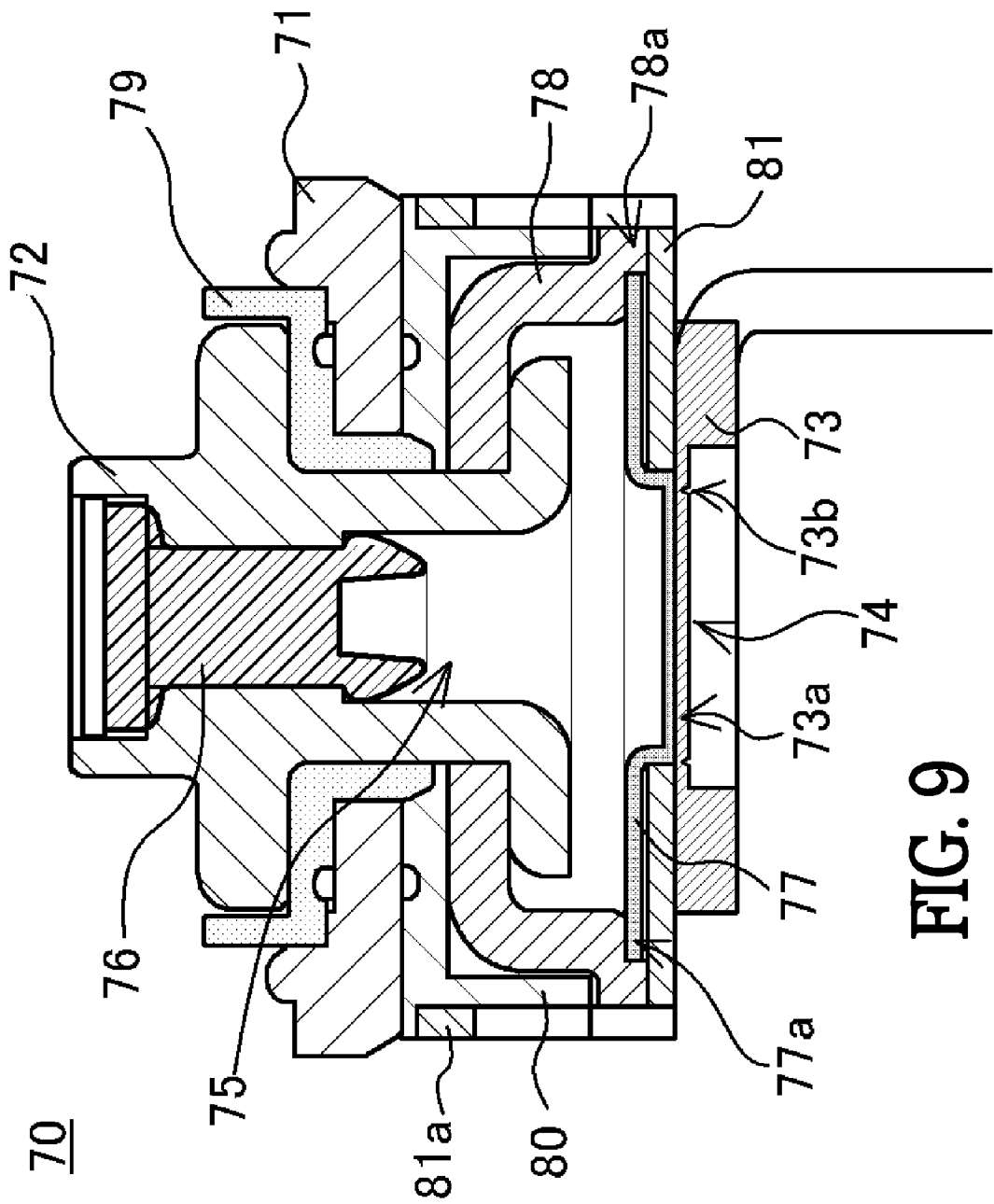
FIG. 9 is a sectional view of an external terminal in still another prismatic secondary battery of the related art.

There will now be described the dispositional relationship between the first region 16a and second regions 16b of a positive electrode collector 16 according to the invention, using FIGS. 6A and 6B. Also described is the dispositional relationship between the first region 16a and second regions 16b of a positive electrode collector 16 not according to the invention, using FIGS. 7A and 7B. In FIGS. 6 and 7, component elements that are the same as those in the nonaqueous electrolyte secondary battery of the embodiment are assigned the same reference numerals, and detailed descriptions of such items are omitted below.

FIG. 6A illustrates an example in which the boundaries 16f between the first region 16a and second regions 16b of the positive electrode collector 16, and all the edges of the first region 16a, are disposed so as to be located further outward than the inner surface of the tubular portion 32a of the conductive member 32. In this example, the whole periphery of the first region 16a of the positive electrode collector 16 will be restricted from any further motion by the tubular portion 32a of the conductive member 32. Therefore, if the wound electrode assembly 11 shifts toward the sealing body 13 due to vibration, falling, etc., the positive electrode collector 16 essentially will not enter completely inside the tubular portion 32a of the conductive member 32.

FIG. 6B illustrates an example in which the boundaries 16f between the first region 16a and second regions 16b of the positive electrode collector 16, and both of the side edges 16m of the first region 16a, are disposed so as to be located further outward than the inner surface of the tubular portion 32a of the conductive member 32, and the protruding edge 16k of the first region 16a is disposed on the inside of the tubular portion 32a of the conductive member 32. In this example, the two side edges 16m of the first region 16a will be restricted from moving by the tubular portion 32a of the conductive member 32. Therefore, if the wound electrode assembly 11 shifts toward the sealing body 13 due to vibration, falling, etc., the protruding edge 16k of the first region 16a essentially will not enter inside the tubular portion 32a of the conductive member 32.

FIG. 6C illustrates an example in which the boundaries 16f between the first region 16a and second regions 16b of the positive electrode collector 16, and the protruding edge 16k and side edges 16m of the first region 16a, are disposed so as to be located further outward than the inner surface of the tubular portion 32a of the conductive member 32, while both of the side surfaces of the first region 16a are disposed on the inside of the tubular portion 32a of the conductive member 32. In this example, the protruding edge 16k and side edges 16m of the first region 16a will be restricted from moving by the tubular portion 32a of the conductive member 32. Therefore, if the wound electrode assembly 11 shifts toward the sealing body 13 due to vibration, falling, etc., the protruding edge 16k and side edges 16m will not enter inside the tubular portion 32a of the conductive member 32, and thus the two side surfaces of the first region 16a will not enter inside the tubular portion 32a of the conductive member 32.

FIG. 6D illustrates an example in which the boundaries 16f between the first region 16a and second regions 16b of the positive electrode collector 16, and one of the side edges 16m of the first region 16a, are disposed so as to be located further outward than the inner surface of the tubular portion 32a of the conductive member 32, while the other side edge 16m of the first region 16a is disposed on the inside of the tubular portion 32a of the conductive member 32. In this example, one side edge 16m and one side surface of the first region 16a will, by and large, be restricted from moving by the tubular portion 32a of the conductive member 32. Therefore, if the wound electrode assembly 11 shifts toward the sealing body 13 due to vibration, falling, etc., the protruding edge 16k and other side edge of the first region 16a will be unlikely to enter inside the tubular portion 32a of the conductive member 32.

By contrast, FIG. 7A illustrates an example in which the boundaries 16f between the first region 16a and second regions 16b of the positive electrode collector 16 are disposed so as to be located further outward than the inner surface of the tubular portion 32a of the conductive member 32, while both the protruding edge 16k and the two side edges 16m of the first region 16a are disposed on the inside of the tubular portion 32a of the conductive member 32. In this example, if the wound electrode assembly 11 shifts toward the sealing body 13 due to vibration, falling, etc., the protruding edge 16k and two side edges 16m of the first region 16a will be liable to enter inside the tubular portion 32a of the conductive member 32, with the supporting part of the first region 16a for the tubular portion 32a of the conductive member 32 acting as fulcrum. With this example, there is a large probability that the current interruption mechanism will be damaged if the wound electrode assembly 11 shifts toward the sealing body 13 due to vibration, falling, etc.

Similarly, FIG. 7B illustrates an example in which the boundaries 16f between the first region 16a and second regions 16b of the positive electrode collector 16, the protruding edge 16k, and both side edges 16m of the first region 16a are all disposed so as to be located on the inside of the tubular portion 32a of the conductive member 32. In this example, if the wound electrode assembly 11 shifts toward the sealing body 13 due to vibration, falling, etc., the boundaries 16f between the first region 16a and second regions 16b of the positive electrode collector 16, the protruding edge 16k, and both side edges 16m of the first region 16a, will all be liable to enter inside the tubular portion 32a of the conductive member 32. With this example, there is the largest probability that the current interruption mechanism will be damaged if the wound electrode assembly 11 shifts toward the sealing body 13 due to vibration, falling, etc.

The foregoing description of the prismatic nonaqueous electrolyte secondary battery 10 of the embodiment sets forth an example where a positive electrode collector 16 is used in which a pair of second regions 16b is formed. However, there may alternatively be a single second region 16b. In this case, it will be preferable that during resistance welding of the second region 16b of the positive electrode collector 16 to the positive electrode substrate exposed portions 14, a collector receiving member of the same material as the positive electrode collector 16 be disposed on the opposite side of the positive electrode substrate exposed portions 14. Furthermore, the method for connection of the positive electrode collector 16 and positive electrode substrate exposed portions 14 is not limited to resistance welding, but may alternatively be laser welding or ultrasonic welding. It is possible to connect the positive electrode collector 16 to the end surfaces of the tips of the positive electrode substrate exposed portions 14. Furthermore, the shape of the first region in the positive electrode collector is not limited to the shape set forth in the foregoing embodiment, but may alternatively be rectangular, etc., viewed from above. In addition, the foregoing description of the prismatic nonaqueous electrolyte secondary battery 10 of the embodiment sets forth an example where the terminal plug 36 of rubber that has a metallic plate 37 is used to seal the through-hole 17b of the positive electrode external terminal 17. However, the terminal plug 36 may be made of resin, or alternatively the through-hole 17b may be sealed by the metallic plate 37 alone.

Although the foregoing description of the prismatic nonaqueous electrolyte secondary battery 10 of the embodiment concerned the structure on the positive electrode external terminal 17 side, this can also be employed as the structure for the negative electrode external terminal 19 side. However, if a structure is employed in which the current interruption mechanism 35 is provided on the positive electrode external terminal 17 side, there will be no need to employ a current interruption mechanism on the negative electrode external terminal 19 side, and hence it is possible to employ a simpler structure for the negative electrode external terminal 19 side.

What is claimed is:

1. A prismatic secondary battery comprising:
   a prismatic outer casing that has a mouth;
   an electrode assembly that is housed inside the prismatic outer casing and has a positive electrode plate and a negative electrode plate;
   a positive electrode collector that is electrically connected to the positive electrode plate;
   a negative electrode collector that is electrically connected to the negative electrode plate;
   a sealing body that seals the mouth of the outer casing and that has a first through-hole;
   at least one external terminal that is inserted into the first through-hole of the sealing body while being electrically insulated from the sealing body with a first insulating member interposed therebetween;
   a conductive member that has a tubular portion, wherein the conductive member has an electrode assembly side end part that is closer to the electrode assembly, and an inner surface of the tubular portion of the conductive member is the inner surface of the electrode assembly side end part,
   an inversion plate containing conductive material, the inversion plate being deformed when the battery interior pressure exceeds a particular value; and
   a second insulating member that is interposed between the inversion plate and at least one of the positive electrode collector and the negative electrode collector, and in which a second through-hole is formed,
   at least one of the positive electrode collector and the negative electrode collector being electrically connected to the inversion plate through the second through-hole of the second insulating member,
   one end of the tubular portion of the conductive member being electrically connected to the external terminal, and the other end being sealed by the inversion plate,
   at least one of the positive electrode collector and the negative electrode collector having a first region that is parallel to the sealing body and a second region that extends from the first region in the direction of the electrode assembly and is connected to the positive electrode plate or negative electrode plate, the first region having an outer edge, and
   the boundary portion between the first and second regions being disposed further outward than the inner surface of the tubular portion of the conductive member, and at least one of the edge portions, other than the boundary portion, being located further outward than the inner surface of the tubular portion of the conductive member.

2. The prismatic secondary battery according to claim 1, wherein the first region protrudes further outward, in all directions, than the inner surface of the tubular portion of the conductive member.

3. The prismatic secondary battery according to claim 1, wherein two second regions are provided, in mutually opposite positions relative to the first region.

4. The prismatic secondary battery according to claim 1, wherein the first and second regions are formed by folding a piece of plate material.

5. The prismatic secondary battery according to claim 1, wherein the first and second regions are formed of a conductive material with rigidity.

6. The prismatic secondary battery according to claim 1, wherein a thin portion and/or a groove is formed at the periphery of the connecting portion between at least one of the positive electrode collector and the negative electrode collector and the inversion plate.

7. The prismatic secondary battery according to claim 1, wherein in the external terminal a through-hole is formed that puts the battery exterior in communication with the space on the inside of the tubular portion of the conductive member, and the through-hole in the external terminal is sealed by a sealing member.

8. The prismatic secondary battery according to claim 1, wherein the electrode assembly is formed in a flattened shape and has a plurality of stacked positive electrode exposed portions at one end and a plurality of stacked negative electrode exposed portions at the other end, with the positive electrode exposed portions being disposed so as to face to one sidewall of the prismatic outer casing and the negative electrode exposed portions being disposed so as to face to the other sidewall of the prismatic outer casing, and with the positive electrode collector being connected to the positive electrode exposed portions and the negative electrode collector being connected to the negative electrode exposed portions.

9. The prismatic secondary battery according to claim 1, wherein
   the tubular portion of the conductive member has a flange portion at which the outside diameter of the tubular portion is enlarged, the flange portion having an inner surface and an outer surface,
   the flange portion is disposed at the electrode assembly side end part, and
   at least one of the edge portions of the first region is disposed further outward than the inner surface of the flange portion.

10. The prismatic secondary battery according to claim 9, wherein
    the whole of the outer edge of the first region is disposed further outward than the inner surface of the flange portion.

11. The prismatic secondary battery according to claim 10, wherein
    the whole of the outer edge of the first region is disposed further outward than the outer surface of the flange portion.

12. The prismatic secondary battery according to claim 11, wherein
    when viewed from a direction perpendicular to the sealing member, the conductive member has an outline having a circular shape.

13. The prismatic secondary battery according to claim 1, wherein
    when viewed from a direction perpendicular to the sealing body, the conductive member has an outline having a circular shape, and
    the whole of the outer edge of the first region is disposed further outward than the whole of the outer edge of the conductive member.

14. The prismatic secondary battery according to claim 1, wherein
    when viewed from a direction perpendicular to the sealing body, the inversion plate has an outline having a circular shape, and the whole of the outer edge of the first region is disposed further outward than the whole of the outer edge of the inversion plate.

15. The prismatic secondary battery according to claim 1, wherein
the tubular portion of the conductive member has a circular cross-sectional shape in a direction parallel to the sealing body,
the conductive member has an opening which is formed at an end of the conductive member that is nearer to the sealing body,
the external terminal is disposed in the opening, and
the tubular portion of the conductive member has an inside diameter larger than an inside diameter of the opening.

16. The prismatic secondary battery according to claim 1, wherein
the tubular portion of the conductive member has a contacting portion at which the tubular portion contacts the inversion plate, and
the inner surface of the tubular portion of the conductive member is the contacting portion.

17. A prismatic secondary battery comprising:
a prismatic outer casing that has a mouth;
an electrode assembly that is housed inside the prismatic outer casing and has a positive electrode plate and a negative electrode plate;
a positive electrode collector that is electrically connected to the positive electrode plate;
a negative electrode collector that is electrically connected to the negative electrode plate;
a sealing body that seals the mouth of the outer casing and that has a first through-hole;
at least one external terminal that is inserted into the first through-hole of the sealing body while being electrically insulated from the sealing body with a first insulating member interposed therebetween;
a conductive member that has a tubular portion;
an inversion plate containing conductive material, the inversion plate being deformed when the battery interior pressure exceeds a particular value; and
a second insulating member that is interposed between the inversion plate and at least one of the positive electrode collector and the negative electrode collector, and in which a second through-hole is formed,
at least one of the positive electrode collector and the negative electrode collector being electrically connected to the inversion plate through the second through-hole of the second insulating member,
one end of the tubular portion of the conductive member being electrically connected to the external terminal, and the other end being sealed by the inversion plate,
at least one of the positive electrode collector and the negative electrode collector having a first region that is parallel to the sealing body and a second region that extends from the first region in the direction of the electrode assembly and is connected to the positive electrode plate or negative electrode plate,
the boundary portion between the first and second regions being disposed further outward than the inner surface of the tubular portion of the conductive member, and at least one of the edge portions, other than the boundary portion, being located further outward than the inner surface of the tubular portion of the conductive member; wherein
the conductive member has an electrode assembly side end part that is closer to the electrode assembly,
the tubular portion of the conductive member has a flange portion at which an outside diameter of the tubular portion is enlarged,
the flange portion is disposed at the electrode assembly side end part,
the inner surface of the tubular portion of the conductive member is the inner surface of the flange portion, and
the whole of the outer edge of the first region is disposed further outward than the inner surface of the flange portion.

18. The prismatic secondary battery according to claim 17, wherein
the tubular portion of the conductive member has a contacting portion at which the tubular portion contacts the inversion plate, and
the inner surface of the tubular portion of the conductive member is the contacting portion.

19. The prismatic secondary battery according to claim 18, wherein
the conductive member has an outline having a circular shape when viewed from a direction perpendicular to the sealing body.

* * * * *